United States Patent
Pailler et al.

(10) Patent No.: US 8,980,027 B2
(45) Date of Patent: Mar. 17, 2015

(54) PROCESS FOR MANUFACTURING A PART MADE OF A CERAMIC MATRIX COMPOSITE CONTAINING MATRIX PHASES FOR HEALING AND DEFLECTING CRACKS

(75) Inventors: René Pailler, Cestas (FR); Nicolas Eberling-Fux, Talence (FR); Eric Philippe, Merignac (FR); Sébastien Bertrand, Moulis-en-Medoc (FR)

(73) Assignee: Herakles, Le Haillan (FR)

( * ) Notice: Subject to any disclaimer, the term of this patent is extended or adjusted under 35 U.S.C. 154(b) by 489 days.

(21) Appl. No.: 12/445,539

(22) PCT Filed: Oct. 16, 2007

(86) PCT No.: PCT/FR2007/052166
§ 371 (c)(1),
(2), (4) Date: Jun. 26, 2009

(87) PCT Pub. No.: WO2008/047038
PCT Pub. Date: Apr. 24, 2008

(65) Prior Publication Data
US 2010/0009143 A1    Jan. 14, 2010

(30) Foreign Application Priority Data
Oct. 17, 2006 (FR) ..................... 06 54326

(51) Int. Cl.
*C03B 29/00* (2006.01)
*C04B 35/628* (2006.01)
(Continued)

(52) U.S. Cl.
CPC ........... *C04B 35/62884* (2013.01); *B82Y 30/00* (2013.01); *C04B 35/5615* (2013.01);
(Continued)

(58) Field of Classification Search
CPC ...... B32B 3/10; B32B 18/00; B32B 2235/02; B32B 38/08; C04B 35/00; C04B 35/573; C04B 41/51; C04B 41/52; C04B 41/88; B05D 1/18; B05D 1/34; B05D 1/36
USPC ............... 428/210, 383; 427/331; 156/89.11, 156/89.26, 89.28
See application file for complete search history.

(56) References Cited

U.S. PATENT DOCUMENTS 4,800,065 A * 1/1989 Christodoulou et al. ..... 420/129
4,889,686 A * 12/1989 Singh et al. ................ 156/89.25
(Continued)

FOREIGN PATENT DOCUMENTS

FR     2675141 A1    10/1992
JP     07-315947     12/1995

OTHER PUBLICATIONS

Chawla, Nikhilesh et al., "High-Frequency Fatigue Behavior of Woven-Fiber-Fabric-Reinforced Polymer-Derived Ceramic-Matrix Composites," Journal of the American Ceramic Society, 1998, vol. 81, No. 5, p. 1221-1230.

(Continued)

*Primary Examiner* — Alex Efta
(74) *Attorney, Agent, or Firm* — Preti Flaherty Beliveau & Pachios LLP

(57) ABSTRACT

The method comprises the steps of: forming a porous fiber-reinforcing structure; introducing into the pores of the fiber structure powders containing elements for constituting the composite material matrix; and forming at least a main fraction of the matrix from said powders by causing a reaction to take place between said powders or between at least a portion of said powders and at least one delivered additional element; the powders introduced into the fiber structure and the delivered additional element(s) comprising elements that form at least one healing discontinuous matrix phase including a boron compound and at least one discontinuous matrix phase including a crack-deflecting compound of lamellar structure. At least a main fraction of the matrix is formed by chemical reaction between the powders introduced into the fiber structure and at least one delivered additional element, or by sintering the powders.

11 Claims, 4 Drawing Sheets

(51) Int. Cl.
*B82Y 30/00* (2011.01)
*C04B 35/56* (2006.01)
*C04B 35/573* (2006.01)
*C04B 35/583* (2006.01)
*C04B 35/65* (2006.01)
*C04B 33/34* (2006.01)
*B32B 9/00* (2006.01)

(52) U.S. Cl.
CPC ............. *C04B35/573* (2013.01); *C04B 35/583* (2013.01); *C04B 35/62863* (2013.01); *C04B 35/62873* (2013.01); *C04B 35/62897* (2013.01); *C04B 35/65* (2013.01); *C04B 2235/3813* (2013.01); *C04B 2235/3821* (2013.01); *C04B 2235/3826* (2013.01); *C04B 2235/3843* (2013.01); *C04B 2235/386* (2013.01); *C04B 2235/3891* (2013.01); *C04B 2235/402* (2013.01); *C04B 2235/404* (2013.01); *C04B 2235/428* (2013.01); *C04B 2235/5248* (2013.01); *C04B 2235/5445* (2013.01); *C04B 2235/5454* (2013.01); *C04B 2235/614* (2013.01); *C04B 2235/616* (2013.01); *C04B 2235/666* (2013.01); *C04B 2235/77* (2013.01); *C04B 2235/78* (2013.01); *C04B 2235/80* (2013.01)

USPC .................. 156/89.11; 156/89.26; 156/89.28; 428/698

(56) References Cited

U.S. PATENT DOCUMENTS

| | | | |
|---|---|---|---|
| 5,079,039 A | 1/1992 | Heraud et al. | |
| 5,094,901 A | 3/1992 | Gray | |
| 5,316,851 A * | 5/1994 | Brun et al. | 428/379 |
| 5,439,627 A * | 8/1995 | De Jager | 264/129 |
| 5,900,277 A * | 5/1999 | Fox et al. | 427/180 |
| 5,939,216 A * | 8/1999 | Kameda et al. | 428/698 |
| 5,962,103 A | 10/1999 | Luthra et al. | |
| 2006/0169404 A1* | 8/2006 | Thebault et al. | 156/307.3 |

OTHER PUBLICATIONS

Moraes, Kevin et al., "Microstructure and Indentation Fracture Behavior of SiC-BN Composites Derived from Blended Precursors of AHPCS and Polyborazylene," Chemistry of Materials American Chemical Society, 2004, vol. 16, p. 125-132.

State Intellectual Property Office of P.R. China, Notification of First Office Action, Oct. 19, 2011, Filing No. 200780038528.6.

* cited by examiner

EPD (TiC + B$_4$C) + RMI (Si)
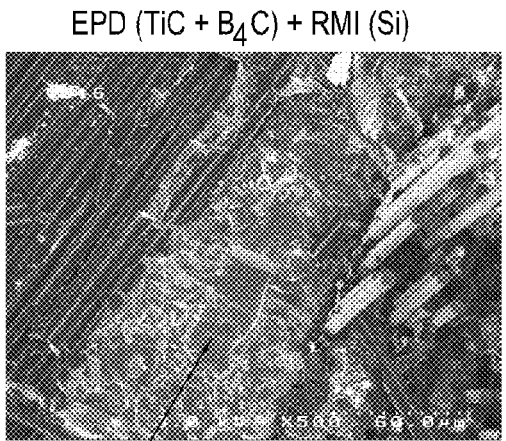
Matrix  FIG.4
EPD (TiC + B$_4$C) + RMI (Si)
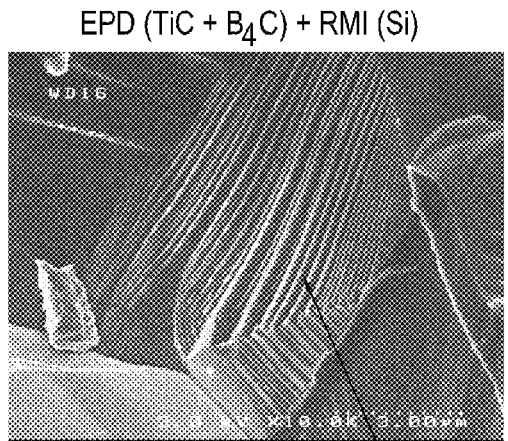
FIG.5  Ti$_3$SiC$_2$ Grain
EPD (TiC + B$_4$C) + RMI (Si + Ti)
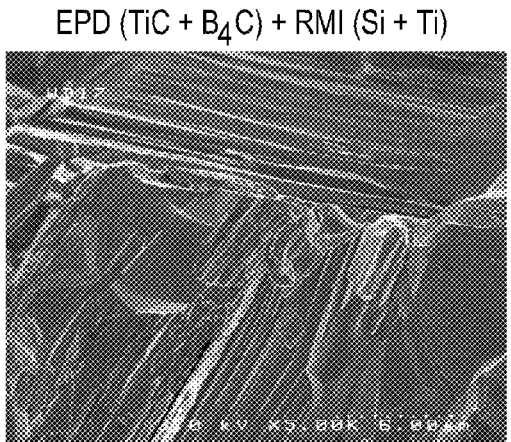
Matrix  FIG.6
EPD (TiC + B$_4$C) + RMI (Si + Ti)
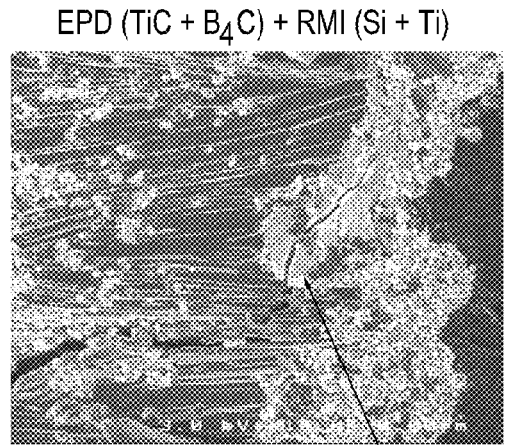
FIG.7  Ti$_3$SiC$_2$ Grain
EPD (TiC + B$_4$C) + RMI (Si + Ti)
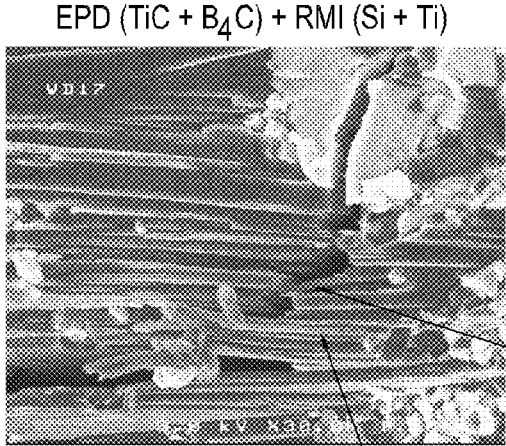
FIG.8
— Deflected crack
Ti$_3$SiC$_2$ Grain EPD (SiC + $B_4C$) + RMI (Ti)

Yarn    Matrix

EPD (SiC + $B_4C$) + RMI ($Ti_6Al_4V$)

Matrix

EPD (SiC + $B_4C$) + RMI (Ti + Si)

Matrix    Deflected crack

EPD (SiC + $B_4C$) + RMI (Ti + Si)

$Ti_3SiC_2$ Grain

PROCESS FOR MANUFACTURING A PART MADE OF A CERAMIC MATRIX COMPOSITE CONTAINING MATRIX PHASES FOR HEALING AND DEFLECTING CRACKS

BACKGROUND OF THE INVENTION

The invention relates to fabricating ceramic matrix composite (CMC) material parts.

CMCs are formed of refractory fiber reinforcement made of carbon or ceramic fibers, together with a ceramic matrix. The fabrication of CMC parts usually comprises making a fiber structure or preform that is to constitute the fiber reinforcement of the composite material, and densifying the preform with the ceramic material of the matrix.

CMCs present mechanical properties that may be suitable for constituting structural parts and they present the ability to conserve these properties at high temperatures in an oxidizing environment.

Nevertheless, whether during fabrication or subsequently on exposure to thermomechanical stresses, CMCs are subjected to the ceramic material cracking. It is desirable to avoid cracks propagating, and in particular propagating as far as the fibers since that might break the fibers, thereby weakening the mechanical properties of the composite material. It is known to coat the fibers in a fiber-matrix interphase coating that has the ability to deflect cracks propagating in the matrix and reaching the interphase coating, while also ensuring bonding between the fibers and the matrix suitable for conferring the desired mechanical properties on the composite material. Crack-deflecting interphase coatings are typically made of pyrolytic carbon (PyC) or of boron nitride (BN), as described in particular in U.S. Pat. No. 4,752,503. It is also know to interpose PyC or BN crack-deflecting continuous phases between ceramic matrix phases, as described in U.S. Pat. No. 5,079,039.

It is also desirable that the appearance of cracks should not make it easier for an oxidizing atmosphere to have access to the core of the material. Such access could have damaging consequences on the fibers, if they are carbon fibers, and also on the interphase coating. It is known for this purpose to provide one or more healing phases within the matrix, i.e. phases capable of healing the cracks that appear in the matrix. Such healing matrix phases are typically made of compounds, in particular boron compounds, that are suitable in the presence of oxygen for forming vitreous compositions that take on a pasty state and that perform a healing action within a certain temperature range. Amongst others, reference can be made to U.S. Pat. No. 5,965,266 that describes the formation of continuous self-healing phases within the matrix.

In the above-mentioned documents, making interphases or matrix phases having crack-deflecting properties or healing properties relies on the chemical vapor infiltration (CVI) technique. That technique is well understood, but it requires very long durations and is therefore quite expensive. Furthermore, using CVI to form matrix phases of different kinds requires changes to the nature to the reaction gas used and to the parameters of the CVI process (temperature, pressure, gas flow rate, . . . ).

U.S. Pat. No. 5,094,901 proposes introducing fillers suitable for producing a healing effect into the fiber structure before making a fiber-matrix interphase by CVI and before forming a ceramic matrix. The fillers are typically one or more materials capable, in the presence of oxygen, of forming $B_2O_3$ and possibly $SiO_2$. Powders of $B_4C$, $SiB_6$, or BN can be used, which powders are introduced into the fiber structure in the dispersed state in a resin solution dissolved in a solvent, with the fiber structure then being impregnated with the resulting suspension. The resin is carbonized prior to forming the interphase. It should be observed that the powders constituting precursors for $B_2O_3$ and possibly $SiO_2$ are put into place solely on the fibers of the reinforcing fiber structure and the fiber-matrix interphase subsequently by CVI.

In U.S. Pat. No. 5,962,103, a method of obtaining a composite having an SiC—Si ceramic matrix comprises forming a fiber-matrix interphase coating on the fibers of the fiber structure, introducing C or SiC or C+SiC and a boron compound in powder form, and infiltrating molten silicon. A composite material is thus obtained that has a matrix with self-healing properties.

OBJECT AND SUMMARY OF THE INVENTION

An object of the invention is to provide a method making it possible to obtain CMCs simply and quickly, the CMCs including at least one healing matrix phase and at least one crack-deflecting matrix phase.

This object is achieved by a method comprising the steps of:

forming a porous fiber-reinforcing structure;

introducing into the pores of the fiber structure powders containing elements for constituting the composite material matrix; and forming at least a main fraction of the matrix from said powders by causing a reaction to take place between said powders or between at least a portion of said powders and at least one delivered additional element;

the powders introduced into the fiber structure and the delivered additional element(s) comprising elements that form at least one healing discontinuous matrix phase including a boron compound and at least one crack-deflecting discontinuous matrix phase including a compound of lamellar structure.

The term "reaction" is used herein to cover:

a chemical reaction between one or more powders introduced in the fiber structure and at least one subsequently delivered additional element, e.g. a reaction with at least one additional element such as molten silicon, molten titanium, or a molten alloy containing silicon or titanium, or molten zirconium; and sintering the powders introduced into the fiber structure, e.g. hot sintering with a pulsed electric field known as spark plasma sintering (SPS).

The term "discontinuous matrix phase" is used herein to mean a matrix phase made up of discrete elements or "grains" that are dispersed within the matrix, i.e. that do not form a phase extending continuously within the matrix, as is the case for a matrix phase obtained by CVI.

The term "crack-deflecting compound of lamellar structure" is used herein to mean a compound having a structure made up of flakes and that can oppose direct propagation of cracks by dissipating the cracking energy by causing flakes of the structure to separate.

The method is remarkable in that the matrix is formed mainly by reaction using powders introduced into the fiber structure, and thus more quickly than when performing a CVI densification process, and in that the or each healing matrix phase and the or each crack-deflecting matrix phase is a discontinuous phase dispersed within the ceramic matrix. The Applicant has observed that not only the healing function, but also and more unexpectedly the crack-deflection function can be performed effectively by discrete elements of a discontinuous matrix phase, and that continuous matrix phases as obtained by a CVI process are not required.

Advantageously, said elements forming the healing and crack-deflecting discontinuous matrix phases include the elements B and C, and at least one of the elements Si and Ti.

In a particular implementation of the invention, at least a major fraction of the matrix is formed by chemical reaction between at least a portion of said powders introduced into the fiber structure and at least one delivered additional element.

The delivered additional element may be at least one of the elements of the group constituted by silicon, titanium, and zirconium, delivered as such or in the form of a compound or an alloy.

Advantageously, said powders introduced into the fiber structure and the delivered additional element(s) comprise at least the elements B, C, Si, and Ti to form at least one healing discontinuous matrix phase including a boron compound and at least one crack-deflecting discontinuous matrix phase including the compound $Ti_3SiC_2$ obtained by chemical reaction.

In a first variant, said powders introduced into the fiber structure comprise at least the elements B, C, and Ti, and at least the element Si is delivered in the form of molten silicon. It is also possible to deliver the element Si and then the element Ti respectively in the form of molten silicon and molten titanium or titanium alloy. The elements B, C, and Ti may be in the form of titanium carbide and boron carbide.

In a second variant, said powders introduced into the fiber structure comprise at least the elements B, C, and Si, and at least the element Ti is delivered in the form of molten titanium or a molten alloy containing titanium. It is also possible to deliver the element Ti and then the element Si respectively in the form of molten titanium or titanium alloy and molten silicon. The elements B, C, and Si may be in the form of silicon carbide and boron carbide.

In a third variant, said powders introduced into the fiber structure comprise at least the elements B and C, and at least the elements Si and Ti are delivered simultaneously in the form of molten silicon and titanium or titanium alloy.

In another implementation of the invention, at least a major fraction of the matrix is formed by sintering said powders introduced into the fiber structure.

The sintering may be performed by an SPS sintering process.

The powders introduced into the fiber structure may then comprise a powder of the titanium silicon-carbide ($Ti_3SiC_2$), a compound that deflects cracks, and/or a powder of boron nitride (BN), a compound that deflects cracks.

Before introducing the powders into the fiber structure, an interphase coating may be formed on its fibers, e.g. a coating of PyC or of BN. The interphase coating may be formed by CVI. The interphase coating may contribute to protecting the fibers of the fiber structure, in particular when they are made of carbon, when at least a fraction of the matrix is being made by chemical reaction, a portion of the interphase coating being then possibly consumed. A protective coating, e.g. of SiC, may optionally be formed on the interphase coating, e.g. by CVI, so as to constitute a reaction barrier and avoid the interphase coating being consumed during the formation of at least a fraction of the matrix by chemical reaction.

Various techniques that are known in themselves can be used for introducing powders into the fiber structure, such as electrophoresis, sucking of the powders under a vacuum, and impregnating by means of a suspension of powders in a liquid.

Preferably, the powders present a mean dimension of less than 1 micrometer ($\mu m$), typically lying in the range 20 nanometers (nm) to 100 nm.

The invention also provides a ceramic matrix composite material part as can be obtained by the above method, in which part the matrix has a main fraction obtained by a reactive process based on powders and comprising at least one healing discontinuous matrix phase including a boron compound dispersed within the matrix, and at least one discontinuous matrix phase including a crack-deflecting compound of lamellar structure dispersed within the matrix.

The compound of lamellar structure may be $Ti_3SiC_2$ and/or BN.

BRIEF DESCRIPTION OF THE DRAWINGS

In the following detailed description, reference is made to the accompanying drawings, in which:

FIGS. 4 to 16 are microphotographs showing the formation of discontinuous matrix phases and the deflection of cracks in CMC materials obtained in accordance with the invention.

DETAILED DESCRIPTION OF IMPLEMENTATIONS OF THE INVENTION

Figure 1:
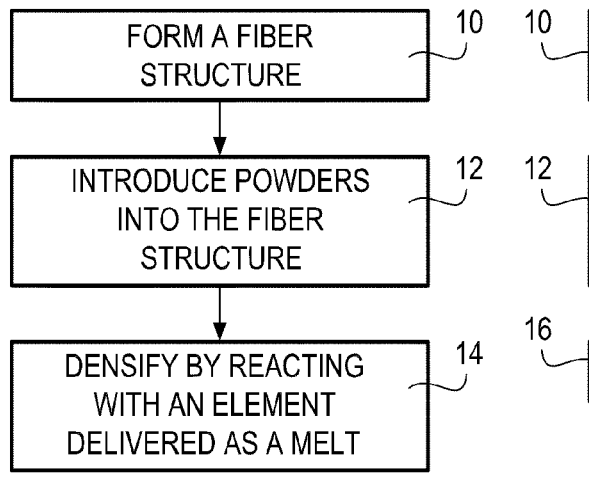
FIGS. 1 and 2 are simplified diagrams showing steps performed in the method of the invention in two particular implementations.
Figure 2:
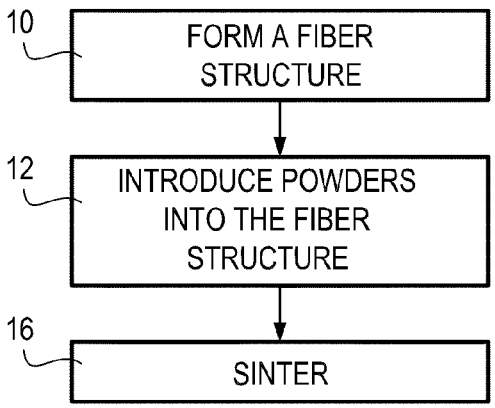

In the implementations of FIGS. 1 and 2, a first step 10 of the method consists in forming a porous fiber structure suitable for constituting the fiber reinforcement of a CMC material part that is to be made. The reinforcing fibers may be carbon fibers or ceramic fibers, such as SiC fibers, possibly coated in carbon.

The operation of forming such a reinforcing fiber structure or fiber preform is itself well known. A three-dimensional fiber structure may be formed from unidirectional fiber elements such as yarns, tows, or tapes, by a winding process or by a process of three-dimensional weaving, braiding, or knitting. It is also possible to form a three-dimensional fiber structure from two-dimensional fiber plies that are superposed and advantageously bonded together, e.g. by needling or by implanting yarns or other unidirectional elements transversely relative to the plies. The two-dimensional fiber plies may be woven fabrics, or unidirectional sheets, or indeed multidirectional sheets formed by superposing unidirectional sheets in different directions and bonding them together.

Advantageously, an interphase coating is formed on the fibers of the reinforcing fiber structure. In known manner, such an interphase coating may be made of PyC or BN, as mentioned above. The interphase coating may be formed on the fibers by CVI, before or after making the fiber structure. Its thickness preferably lies in the range 0.1 $\mu m$ to 2 $\mu m$.

A protective coating may be formed on the interphase coating in order to protect it and the underlying fibers against possible chemical attack when making the CMC material matrix involves a chemical reaction with a delivered additional element such as molten silicon or titanium. Such a coating forming a protective barrier may be made of SiC, for example. The protective coating may be formed on the interphase coating by CVI, before or after making the fiber structure. Its thickness preferably lies in the range 0.1 $\mu m$ to 2 $\mu m$.

In a following step 12 of the method of the invention, the porous fiber structure with its fibers advantageously provided with an interphase coating and possibly provided with a protective coating, has its pores filled in at least in part by introducing powders.

The powders that are used contribute at least some of the elements needed for forming at least a main portion of the ceramic matrix comprising at least one healing discontinuous matrix phase including a boron compound and at least one discontinuous matrix phase including a crack-deflecting compound of lamellar structure.

The powders introduced into the fiber structure are of small grain size so as to be capable of penetrating into the pores of the fiber structure all the way to the core thereof. The mean dimension of the powders is thus advantageously selected to be less than 1 μm, preferably lying in the range 20 nm to 100 nm.

Various known methods can be used for introducing powders into the pores of the fiber structure.

A first method consists in impregnating the fiber structure with a suspension containing the powders. Impregnation may be formed under pressure with the fiber structure being immersed in a bath containing the suspension.

A second method consists in performing vacuum suction of the powders, proceeding in a manner similar to that described in document U.S. Pat. No. 5,352,484 for introducing carbon powder into a porous substrate. A suspension containing the powders is brought to one side of the fiber structure and a pressure difference is established to force the suspension to pass through the fiber structure, filtering being performed on the other side of the fiber structure in order to retain the powders inside the structure.

A third method consists in using electrophoresis. As shown very diagrammatically in FIG. 3, a porous fiber structure 20, in the form of a plate in the example shown, is immersed in a vessel 22 containing a suspension 24 of powders to be introduced into the fiber structure. The fiber structure 20 is placed between two electrodes 26 and 28, e.g. made of graphite. The electrophoresis process can be used with a fiber structure that conducts electricity, such as a fiber structure made of carbon fibers or of ceramic fibers, e.g. SiC fibers, when coated with carbon as obtained in particular by a pyrolytic technique. A direct current (DC) power supply circuit 30 has one terminal connected in parallel to the electrodes 26 and 28, and another terminal connected to the fiber structure 20. As a result, electrically-charged particles of powder migrate towards the fiber structure 20 and progressively fill in its pores.

Drying is performed after the powders have been introduced.

In the implementations of FIGS. 1 and 2, ceramic compound powders may be used to contribute directly to forming one or more discontinuous ceramic matrix phases that are not necessarily healing or crack-deflecting. By way of example, such powders may be powders of silicon carbide SiC and/or titanium carbide TiC.

In addition, still in the implementations of FIGS. 1 and 2, boron-containing compounds such as, in particular: boron carbide $B_4C$; silicon hexaboride $SiB_6$; titanium diboride $TiB_2$; and/or aluminum borides $AlB_2$, $AlB_{12}$ may be used for contributing to forming at least one healing discontinuous matrix phase.

In the implementation of FIG. 1, a step 14 is performed on the preform obtained after powders have been introduced into the fiber structure, during which step densification is performed by chemical reaction with at least one additional element that is delivered while molten, with a discontinuous matrix phase being formed.

In particular, the delivered additional element may be silicon, titanium, and/or zirconium, as such, or in the form of a compound or an alloy.

Advantageously, a discontinuous matrix phase including the crack-deflecting compound $Ti_3SiC_2$ is obtained by chemical reaction between powders introduced into the fiber structure such as powders of SiC and/or powders of TiC, and titanium or silicon delivered in molten form. The SiC and/or TiC powders can then contribute both to forming SiC and/or TiC ceramic matrix phases and a crack-deflecting discontinuous matrix phase.

When the powders introduced into the fiber structure comprise a TiC powder, a siliciding chemical reaction is performed with the molten silicon that gives $Ti_3SiC_2$, together with SiC and possibly $TiSi_2$:

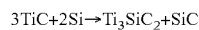
$$3TiC + 2Si \rightarrow Ti_3SiC_2 + SiC$$

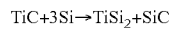
$$TiC + 3Si \rightarrow TiSi_2 + SiC$$

SiC may also be produced by reaction between silicon and carbon that may come from a PyC interphase present on the fibers, in the absence of a coating forming a protecting barrier on the interphase coating, or that may come from carbon powder introduced into the fiber structure.

Molten titanium may then be delivered to increase the quantity of $Ti_3SiC_2$ by reaction with SiC and with the carbon coming from SiC or present in the powders introduced into the fiber structure, or coming from a PyC interphase formed on the fibers:

$$SiC + C + 3Ti \rightarrow Ti_3SiC_2$$

The compounds $Ti_5Si_3$ and TiC may also be produced.

When the powders introduced into the fiber structure contain SiC powder, a titanizing chemical reaction is performed with the molten titanium, giving $Ti_3SiC_2$:

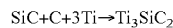
$$SiC + C + 3Ti \rightarrow Ti_3SiC_2$$

C being present in the powders introduced in the fiber structure or coming from SiC for coming from a PyC interphase in the absence of a coating forming a reaction barrier on the PyC interphase. The compounds $Ti_5Si_3$ and $TiSi_2$ may also be produced.

Molten silicon may then be delivered to increase the quantity of $Ti_3SiC_2$ by reaction with TiC, thereby reducing the quantity of TiC.

The chemical reaction with the molten silicon or titanium is produced by infiltrating titanium or silicon in the molten state into the fiber structure in which powders have previously been introduced. It is also possible to use a metal alloy of titanium in the molten state, e.g. $Ti_6Al_4V$.

To this end, the fiber preform may be placed in conventional manner in a receptacle or crucible together with a bar of silicon or of titanium or of titanium alloy. The assembly is placed in an oven to raise its temperature beyond the melting point of silicon, or of titanium, or of the titanium alloy. There is no need for the preform to be fully immersed. It suffices that a portion of the fiber structure is in contact with the molten silicon or titanium, which is then drawn progressively into the preform by capillarity. Infiltration may be facilitated by establishing reduced pressure in the oven by connecting it to a vacuum source.

Likewise in conventional manner, it is also possible to connect the preform to a bath of molten silicon or titanium or titanium alloy by means of a drain bringing the molten silicon, titanium, or titanium alloy to the preform by capillarity, with impregnation in the pores of the preform likewise taking place by capillarity. The drain may be made of refractory fibers, e.g. SiC fibers or (at least in the initial state) carbon fibers, in the form of a wick, a tape, or the like. Such a process is described in particular in document WO 2004/076381.

The temperature at which the silicon or the titanium is raised is selected to be higher than its melting point, e.g. lying in the range 1450° C. to 1500° C. for silicon and in the range 1700° C. to 1750° C. for titanium. For a titanium alloy such as $Ti_6Al_4V$, the melting point is lower than that of titanium, and it is possible to adopt a temperature lying in the range 1650° C. to 1700° C.

The above relates to siliciding followed by titanizing, or vice versa. In a variant, it is possible to perform siliciding and titanizing simultaneously by delivering silicon and titanium or a titanium alloy in the molten state at the same time. The powders previously introduced into the fiber structure then comprise at least the elements B and C, e.g. powders of a boron-containing compound and powders of carbon and/or carbide(s) such as SiC and/or TiC. The simultaneous delivery of Si and Ti may be performed using powders of Si and Ti or powders of Si and of a Ti alloy, or powders of Si and a Ti compound such as $TiSi_2$.

When zirconizing is performed by delivering molten zirconium, it is possible to form at least one healing discontinuous matrix phase by previously introducing powders into the fiber structure, which powders contain a crack-deflecting compound of lamellar structure such as BN.

In the implementation of FIG. 2, after step 12 of introducing powders into the fiber structure, a sintering step 16 is performed.

Thus, the powders introduced into the fiber structure need to comprise: boron-containing compounds needed for forming at least one healing discontinuous matrix phase; possibly compounds such as TiC and/or SiC forming at least one non-healing discontinuous ceramic matrix phrase that does not deflect cracks, should such a ceramic phase be desired; and compounds of lamellar structure that contribute directly to forming a crack-deflecting discontinuous matrix phase. These compounds are $Ti_3SiC_2$ and/or BN, in particular.

It is possible to use natural sintering without stress or sintering under stress, e.g. by hot pressing, or preferably hot sintering while applying an electric field and pressure, or SPS sintering.

Such an SPS sintering process is itself known. The powder-filled fiber structure is placed in a receptacle made of a material that conducts electricity, typically graphite, and a continuous or pulsed electric field is applied while simultaneously applying pressure (typically lying in the range 10 megapascals (MPa) to 100 MPa). The sintering is the result of the rise in temperature and it appears to be encouraged by a plasma being generated between adjacent particles of powder. By making a fiber structure of shape that corresponds to the fiber reinforcement for a CMC material part that is to be made, it is possible with a method of the invention to obtain a ceramic matrix that includes at least one discontinuous healing phase that includes a boron compound dispersed within the matrix, and at least one discontinuous matrix phase that includes a compound of lamellar structure that deflects cracks and that is dispersed within the matrix, the lamellar compound being constituted in particular by $Ti_3SiC_2$ and/or BN.

The method of the invention may be used to form all of the CMC material matrix by densifying a fiber structure in which the fibers may be provided with an interphase coating and possibly with an additional coating for protection purposes, or it may be used to form a main fraction, i.e. a majority fraction, of the ceramic matrix. Under such circumstances, a minority fraction of the matrix may be formed by a conventional CVI process or by a conventional liquid process, i.e. impregnation by means of a liquid composition that contains a matrix precursor, such as a resin, followed by transformation of the precursor by pyrolysis.

Such a minority fraction may be constituted in particular by an initial consolidation matrix phase serving to bond together the fibers of the fiber structure sufficiently to make it strong enough to enable it to be handled while conserving its shape, with only a small fraction of the pore space within the fiber structure being filled. It is also possible for such a minority fraction to be constituted in particular by a terminal matrix phase made after the main matrix has been performed by reaction, and for the purpose of reducing residual pores.

There follows a description of examples of implementations of the method of the invention.

EXAMPLE 1

A porous fiber structure in the form of a plate having a thickness of 3 millimeters (mm) was made by three-dimensionally weaving continuous carbon fiber yarns, the fiber structure presenting a pore volume fraction of about 70%.

A PyC interphase coating of thickness equal to about 1 µm was formed on the fibers by a CVI process, after the fiber structure had been made and in well-known manner.

$B_4C$ powders having a mean size of about 150 nm and TiC powders having a mean size of about 30 nm were put into suspension in ethanol with the suspension being homogenized by stirring, at volume fractions of 11% for TiC and 2% for $B_4C$.

Figure 3:
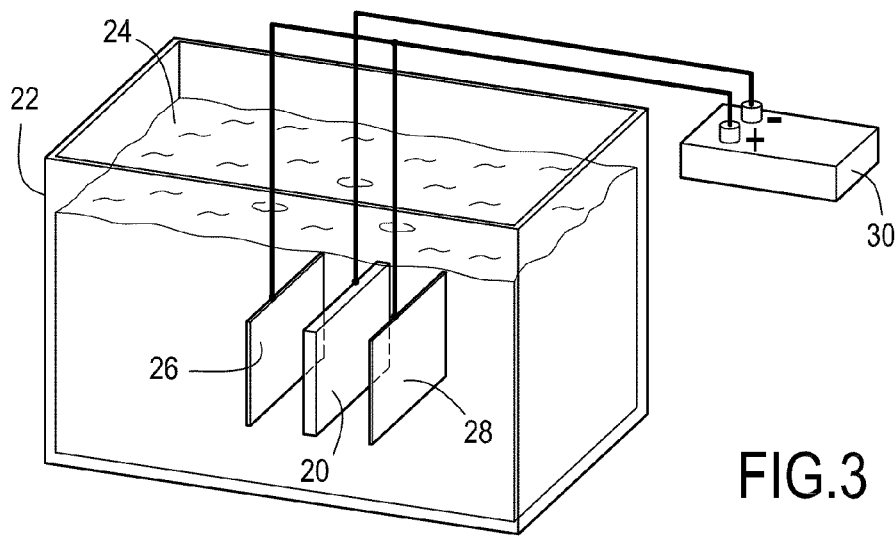
FIG. 3 is a highly diagrammatic view of an installation for introducing powders into a porous fiber structure by electrophoresis.

The suspension was introduced into a vessel of an electrophoresis installation of the kind shown in FIG. 3 and the fiber structure was immersed in the vessel between electrodes that were powered to deliver an electric field of about 40 volts per centimeter (V/cm) for a period of about 2 minutes (min). After the powder-filled fiber structure had been removed from the vessel and dried, its relative weight increase was measured and found to be about 406%, this increase being determined by computing $100(m_1-m_0)/m_0$ where $m_1$ is the weight of the powder-filled dry fiber structure and $m_0$ is the weight of the dry fiber structure before introducing the powders.

Thereafter, siliciding was performed by chemical reaction between the powders introduced into the fiber structure and silicon delivered while molten. For this purpose, the powder-filled fiber structure was placed in a crucible together with silicon and was inserted into an oven in which the temperature was raised to about 1450° C. while connecting the oven enclosure to a vacuum source in order to encourage penetration of the molten silicon into the core of the fiber structure. The quantity of silicon was selected to be sufficient but without significant excess, to enable the following reaction:

$$3TiC+2Si \rightarrow Ti_3SiC_2+SiC$$

to take place completely as a function of the quantity of TiC powder present in the fiber structure. After siliciding, the volume fraction of the residual pores was about 17% and the relative density reached was about 2.9.

The X-ray diffraction (XRD) phase diagram showed in particular that the matrix contained not only $Ti_3SiC_2$ and SiC phases, but also TiC, $TiSi_2$, and $TiB_2$ phases. In addition to the above reaction giving $Ti_3SiC_2$ and SiC, it is assumed that the following reactions also take place:

$$C+Si \rightarrow SiC \text{ (C coming from the PyC interphase)}$$

$$TiC+3Si \rightarrow TiSi_2+SiC$$

$$B_4C+2TiC+3Si \rightarrow 2TiB_2+3SiC$$

The microphotographs of FIGS. 4 and 5 show respectively the resulting dense ceramic matrix and, on a smaller scale, a Ti₃SiC₂ grain of characteristic lamellar structure. In the legends of FIGS. 4, 5, et seq., the terms "EPD" and "RMI" designate respectively a process for introducing or depositing powders by electrophoresis ("electrophoresis deposition") and a reactive process of infiltrating a molten element ("reactive melt infiltration").

EXAMPLE 2

The procedure was as in Example 1, but siliciding was limited so that once finished the volume fraction of the residual pores was about 21%, with a relative density of about 2.5.

A titanizing operation was then performed by chemical reaction between firstly the powders introduced into the fiber structure and the phases formed during siliciding, and secondly titanium delivered in molten form. For this purpose, the part obtained after siliciding was placed in a crucible together with a bar of titanium, and it was inserted into an oven in which the temperature was raised to a temperature of about 1725° C., while connecting the oven enclosure to a vacuum source. After titanizing, the volume fraction of the residual pores was about 8% and relative density had increased to about 3.6.

The XRD phase diagram showed the presence in the matrix of the following phases in particular: Ti₃SiC₂, SiC, TiC, TiB₂, Ti₅Si₃, and Ti. The effect of titanizing after siliciding was to increase the quantity of the discontinuous Ti₃SiC₂ phase in the matrix and to reduce the quantity of the SiC matrix phase, by the following reaction:

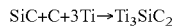
$$SiC + C + 3Ti \rightarrow Ti_3SiC_2$$

the C coming from the PyC interphase and/or the carbide phases forming during siliciding.

The microphotographs of FIGS. 6 and 7 show the matrix obtained with the presence of Ti₃SiC₂ grains in the matrix. FIG. 8 on a more reduced scale shows the effect of a grain of Ti₃SiC₂ deflecting a crack that had arisen in the matrix.

EXAMPLE 3

The procedure was as in Example 1, but a PyC interphase having a thickness of about 2 μm was made on the fibers of the fiber structure, the TiC powder was replaced with SiC powder (in the same volume fraction in the powder suspension) having a mean size of about 50 nm, and siliciding was replaced by titanizing.

The fiber structure filled with SiC and B₄C powders was titanized by chemical reaction with titanium delivered in molten form, in the same manner as in Example 2. A CMC material part was obtained having a residual pore fraction of about 10% and a relative density of about 3.5.

The XRD phase diagram shows in particular the presence in the matrix of the following phases: Ti₃SiC₂, SiC, TiC, TiB₂, and Ti₅Si₃, with the Ti₃SiC₂ compound being obtained by the same reaction as in Example 2:

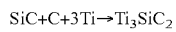
$$SiC + C + 3Ti \rightarrow Ti_3SiC_2$$

the C coming from the PyC interphase.

The relatively great thickness of the PyC interphase on the fibers allowed a portion of the interphase to be sacrificed without reaching the fibers.

Figure 9:
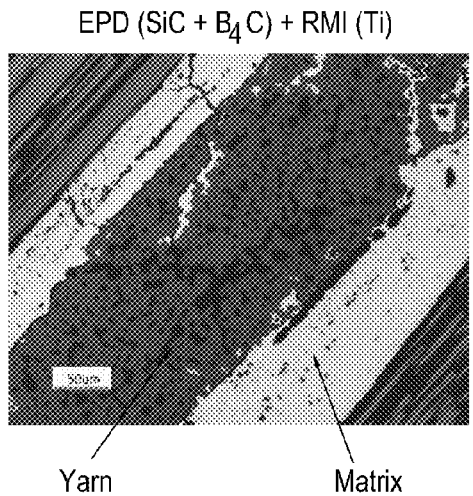

The microphotograph of FIG. 9 shows the resulting dense matrix.

EXAMPLE 4

The procedure was as in Example 3, but titanizing was performed by reacting with a molten alloy of titanium, aluminum, and vanadium, Ti₆Al₄V, at a temperature of about 1675° C. After titanizing, the volume fraction of the residual pores was about 5% and the relative density about 3.3.

The XRD phase diagram showed the presence in the matrix of the following phases: Ti₃SiC₂, SiC, TiC, Ti, TiB₂, and Ti₅Si₃.

Figure 10:
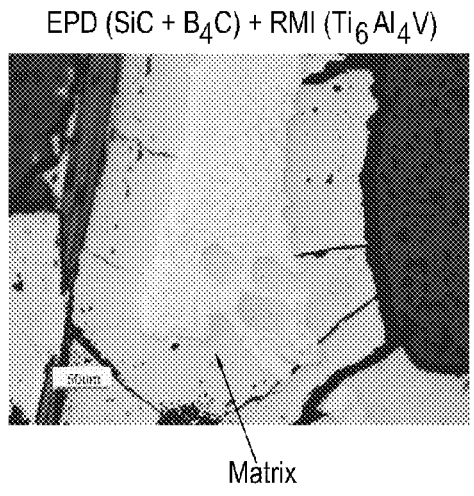

The microphotograph of FIG. 10 shows the resulting dense matrix.

The advantage of Ti₆Al₄V alloy is that it enables titanizing to be performed at a temperature lower than that required for titanizing when using titanium on its own.

EXAMPLE 5

The procedure was as in Example 3, but titanizing was limited so that after it had been performed, the residual pore volume fraction was about 11% and the relative density was about 3.5.

Siliciding was then performed under conditions similar to those described in Example 1. After siliciding, the residual pore volume fraction was reduced to about 8% and the relative density reached about 3.4.

The XRD phase diagram showed the presence in the matrix of the following phases: Ti₃SiC₂, SiC, TiC, TiB₂, and TiSi₂. The siliciding performed after the titanizing had the effect of increasing the quantity of the Ti₃SiC₂ discontinuous matrix phase and of reducing the quantity of the TiC matrix phase by the following reaction:

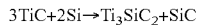
$$3TiC + 2Si \rightarrow Ti_3SiC_2 + SiC$$

Figure 11:
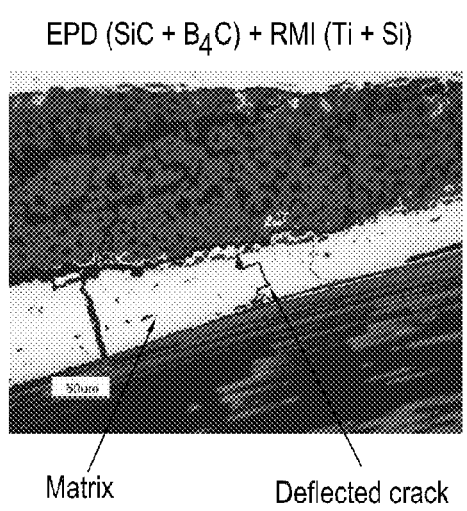
Figure 12:
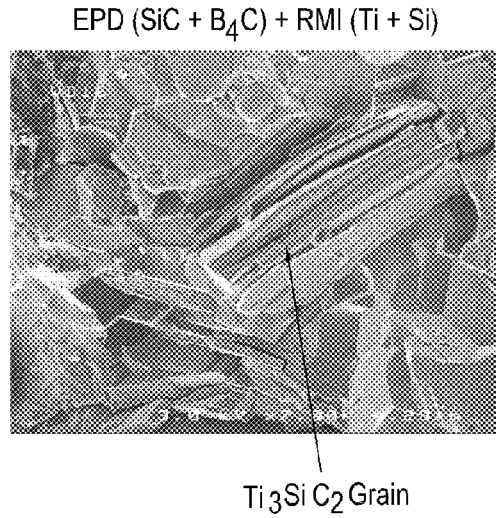

The microphotographs of FIGS. 11 and 12 show the resulting dense matrix, and on a more reduced scale, a Ti₃SiC₂ grain of lamellar structure.

EXAMPLE 6

Fiber structures in the form of cylindrical samples having a diameter of about 50 mm and a thickness of about 2 mm were obtained by being cut out from a fiber plate made by three-dimensional weaving of continuous carbon fiber yarns.

A PyC interphase coating having a thickness of about 0.1 μm was formed on the fibers by a CVI process, after the samples had been made.

SiC powders with a mean size of about 50 nm and BN powders with a mean size of about 140 nm were put into suspension in ethanol and the suspension was homogenized by stirring, the volume fractions of SiC and of BN being respectively about 11% and about 3%.

The SiC and BN powders were introduced into the fiber structure samples by using an electrophoresis process as in Example 1. A relative weight increase of about 330% was measured on the samples as filled with powder and dried.

Thereafter, SPS sintering was performed on the powder-filled samples. With an SPS sintering temperature of about 1600° C., it was possible to obtain a part having a residual pore volume fraction of about 22% and a relative density of about 2.35. When performing SPS sintering at a temperature of about 1650° C., it was possible to obtain a part having a residual pore volume fraction of about 16% and a relative density of about 2.36.

Figure 13:
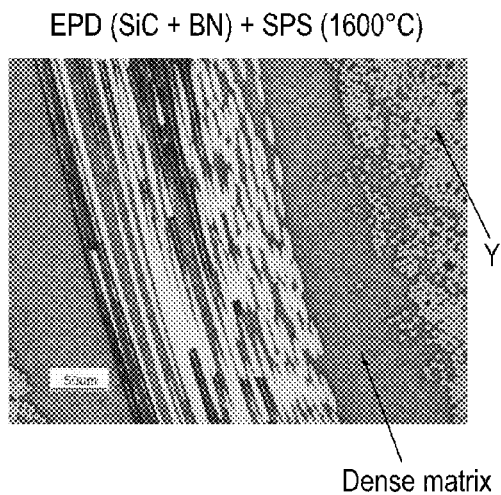
Figure 14:
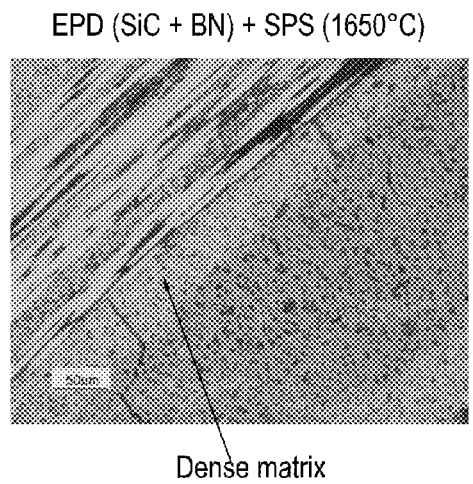
Figure 15:
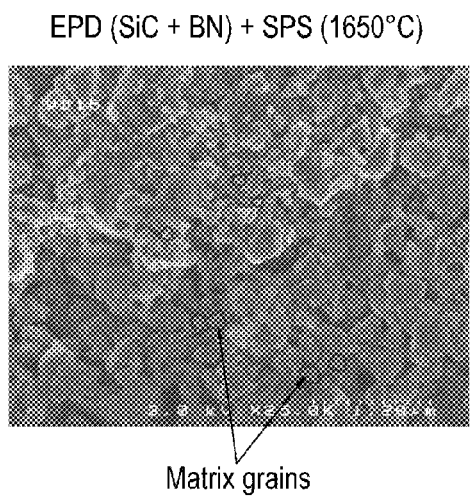

The microphotographs of FIGS. 13 and 14 show the dense matrices obtained for respective SPS sintering temperatures of about 1600° C. and 1650° C., and FIG. 15 shows on a more reduced scale the mean size and the shape of the discontinuous matrix grains for SPS sintering at 1650° C.

By way of comparison, a fiber structure sample similar to that used in this example, but having an interphase coating with a thickness of about 0.3 µm was densified with an SiC matrix by means of a CVI process. It was possible to obtain a residual pore volume fraction of about 15% with a relative density of about 2.3. The method of introducing powders and SPS sintering at 1650° C. makes it possible to obtain very similar values, while being much quicker to perform and enabling a discontinuous matrix phase of BN to be formed that constitutes both a compound of lamellar structure that deflects cracks and a boron-containing compound that constitutes a healing discontinuous matrix phase.

Figure 16:
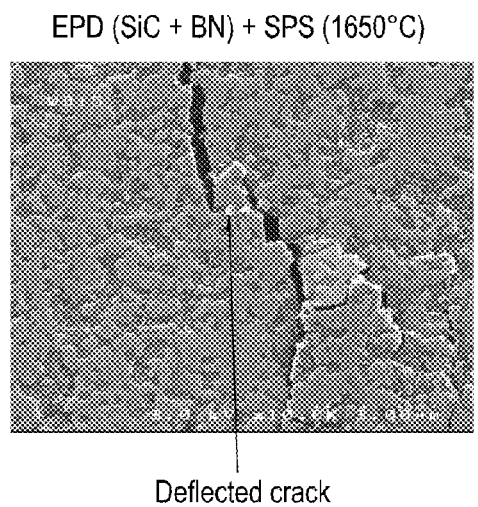

An impact test (Vickers hardness test) was performed on a part obtained after SPS sintering at 1650° C. FIG. 16 is a microphotograph showing a crack produced by the impact and the crack-deflection effect provided by the presence of the lamellar structure BN compound.

The invention claimed is:

1. A method of fabricating a part of composite material having a fiber reinforcement densified with a ceramic matrix, the method comprising the steps of:
   forming a three-dimensional porous fiber structure to constitute the fiber reinforcement for the part to be fabricated;
   providing a suspension of powders in a liquid, the powders having a mean dimension of less than 1 µm and including powder of at least one boron-containing compound and powder of at least one of carbon, silicon carbide and titanium carbide;
   contacting said three-dimensional porous fibrous structure with said suspension to introduce said powders into the pores of the previously formed three-dimensional porous fiber structure; and
   forming at least a main fraction of the matrix by chemical reaction between at least a portion of said powders and at least one delivered additional element selected from silicon and titanium, with both silicon and titanium being present in said powders and at least one delivered additional element taken together;
   said chemical reaction being achieved by infiltrating the fiber structure with at least one of molten silicon, molten titanium and molten titanium-containing alloy, in order to form a matrix comprising at least one healing discontinuous matrix phase from said boron compound and at least one crack-deflecting discontinuous matrix phase of $Ti_3SiC_2$, said crack-deflecting discontinuous phase of $Ti_3SiC_2$ being obtained at least in part by chemical reaction between silicon carbide in powder form, carbon and molten titanium or molten titanium-containing alloy or molten silicon.

2. A method according to claim 1, wherein said powders introduced into the fiber structure comprise at least the elements B, C, and Ti, and at least the element Si is delivered in the form of molten silicon.

3. A method according to claim 1, wherein said powders introduced into the fiber structure comprise at least the elements B, C, and Ti, and the element Si and then the element Ti are delivered successively in the form respectively of molten silicon and of molten titanium or titanium-containing alloy.

4. A method according to claim 2, wherein said powders introduced into the fiber structure comprise titanium carbide and boron carbide.

5. A method according to claim 1, wherein said powders introduced into the fiber structure comprise at least the elements B, C, and Si, and at least the element Ti is delivered in the form of molten titanium or a molten alloy containing titanium.

6. A method according to claim 1, wherein said powders introduced into the fiber structure comprise at least the elements B, C, and Si, and the element Ti and then the element Si are delivered successively in the form respectively of molten titanium or a molten alloy containing titanium, and of molten silicon.

7. A method according to claim 5, wherein said powders introduced in the fiber structure comprise a silicon carbide and a boron carbide.

8. A method according to claim 1, wherein said powders introduced into the fiber structure comprise at least the elements B and C, and at least the elements Si and Ti are delivered simultaneously in the form of molten silicon and titanium or titanium alloy.

9. A method of fabricating a part of composite material having a fiber reinforcement densified with a ceramic matrix, the method comprising the steps of:
   forming a three-dimensional porous fiber structure to constitute the fiber reinforcement for the part to be fabricated;
   providing a suspension of powders in a liquid, the powders having a mean dimension of less than 1 µm and including powder of at least one boron-containing compound and powder of at least one of carbon, silicon carbide and titanium carbide;
   contacting said three-dimensional porous fibrous structure with said suspension to introduce said powders into the pores of the previously formed three-dimensional porous fiber structure; and
   forming at least a main fraction of the matrix by chemical reaction between at least a portion of said powders and at least one delivered additional element selected from silicon and titanium, with both silicon and titanium being present in said powders and at least one delivered additional element taken together;
   said chemical reaction being achieved by infiltrating the fiber structure with at least one of molten silicon, molten titanium and molten titanium-containing alloy, in order to form a matrix comprising at least one healing discontinuous matrix phase from said boron compound and at least one crack-deflecting discontinuous matrix phase of $Ti_3SiC_2$,
   wherein said powders introduced into the fiber structure comprise at least the elements B, C, and Ti, and the element Si and then the element Ti are delivered successively in the form respectively of molten silicon and of molten titanium or titanium-containing alloy, or wherein said powders introduced into the fiber structure comprises at least the element B, C, and Si, and the element Ti and then the element Si are delivered successively in the form respectively of molten titanium or a molten alloy containing titanium, and of molten silicon.

10. A method of fabricating a part of composite material having a fiber reinforcement densified with a ceramic matrix, the method comprising the steps of:
    forming a three-dimensional porous fiber structure to constitute the fiber reinforcement for the part to be fabricated;
    providing a suspension of powders in a liquid, the powders having a mean dimension of less than µm and including powder of at least one boron-containing compound and powder of at least one of carbon, silicon carbide and titanium carbide;

contacting said three-dimensional porous fibrous structure with said suspension to introduce said powders into the pores of the previously formed three-dimensional porous fiber structure; and forming at least a main fraction of the matrix by chemical reaction between at least a portion of said powders and at least titanium, and silicon being present in said powders;

said chemical reaction being achieved by infiltrating the fiber structure with at least one of molten titanium and molten titanium-containing alloy, in order to form a matrix comprising at least one healing discontinuous matrix phase from said boron compound and at least one crack-deflecting discontinuous matrix phase of $Ti_3SiC_2$, said crack-deflecting discontinuous phase of $Ti_3SiC_2$ being obtained at least in part by chemical reaction between silicon carbide in powder form, carbon and molten titanium or molten titanium-containing alloy.

11. A method of fabricating a part of composite material having a fiber reinforcement densified with a ceramic matrix, the method comprising the steps of:

forming a three-dimensional porous fiber structure to constitute the fiber reinforcement for the part to be fabricated;

providing a suspension of powders in a liquid, the powders having a mean dimension of less than 1 μm and including powder of at least one boron-containing compound and powder of at least one of carbon, silicon carbide and titanium carbide;

contacting said three-dimensional porous fibrous structure with said suspension to introduce said powders into the pores of the previously formed three-dimensional porous fiber structure; and forming at least a main fraction of the matrix by chemical reaction between at least a portion of said powders and at least one delivered additional element selected from silicon and titanium, with both silicon and titanium being present in said powders and at least one delivered additional element taken together;

said chemical reaction being achieved by infiltrating the fiber structure with at least one of molten titanium and molten titanium-containing alloy, in order to form a matrix comprising at least one healing discontinuous matrix phase from said boron compound and at least one crack-deflecting discontinuous matrix phase of $Ti_3SiC_2$, said crack-deflecting discontinuous phase of $Ti_3SiC_2$ being obtained at least in part by chemical reaction between silicon carbide in powder form, carbon and molten titanium or molten titanium-containing alloy.

* * * * *